United States Patent [19]

Urabe et al.

[11] Patent Number: 4,750,355
[45] Date of Patent: Jun. 14, 1988

[54] WIND-VELOCITY CONTROLLING APPARATUS FOR SIMULATING SELF-PROPELLED VEHICLE VELOCITY

[75] Inventors: Sadayuki Urabe, Yokohama; Fumio Kakizaki, Tokyo, both of Japan

[73] Assignee: Kabushiki-Kaisha Toyo Seisakusho, Tokyo, Japan

[21] Appl. No.: 23,459

[22] Filed: Mar. 9, 1987

[30] Foreign Application Priority Data

Feb. 19, 1987 [JP] Japan .................................. 62-36678

[51] Int. Cl.⁴ ............................................ G01M 9/00
[52] U.S. Cl. ..................................... 73/147; 73/865.6
[58] Field of Search ...................... 73/147, 117, 865.6, 73/146, 9

[56] References Cited

U.S. PATENT DOCUMENTS 4,073,188  2/1978  Slezinger et al. .................... 73/147
4,308,748  1/1982  Jacocks .................................. 73/147
4,593,558  6/1986  Barske .................................. 73/147

Primary Examiner—Donald O. Woodiel
Attorney, Agent, or Firm—Frishauf, Holtz, Goodman & Woodward

[57] ABSTRACT

In conducting an environmental test of a vehicle, the vehicle is housed in the testing chamber and in which the vehicle is subjected to test simulating external environmental various conditions. In such test, it is often required to keep the vehicle stationary while varying a temperature and a humidity of the testing chamber. In such a case, the testing chamber provided with a by-pass air duct at a position near a ceiling portion of the testing chamber enables the vehicle being tested to be prevented from being subjected to an air flow caused by air-conditioning operation of the testing chamber, which improves a test in accuracy in case that the test must be conducted at a desired temperature/humidity condition.

5 Claims, 2 Drawing Sheets

WIND-VELOCITY CONTROLLING APPARATUS FOR SIMULATING SELF-PROPELLED VEHICLE VELOCITY

BACKGROUND OF THE INVENTION

1. Field of the Invention:

The present invention relates to a wind-velocity controlling apparatus for simulating a velocity of a traveling self-propelled vehicle, particularly a traveling automobile, in which apparatus a wind with a velocity simulating that of the traveling automobile is issued against the automobile being tested while kept stationary therein.

2. Description of the Prior Art:

Hitherto, there has been known a wind-velocity controlling apparatus for simulating the velocity of the automobile, which apparatus is provided with an environmental testing chamber in which the automobile being tested is housed and subjected to an environmental test under various temperature/humidity conditions simulating those of actual outdoor's to which the automobile is subjected while traveling.

In such a conventional apparatus, when a test simulating that a velocity of the vehicle being tested is zeroed, a velocity of a wind to be issued against such vehicle is also reduced to zero. However, in this case, it is necessary to recirculate a predetermined amount of an air through an air-conditioning unit in the apparatus for keeping the testing chamber in desired temperature/humidity conditions.

Consequently, in the conventional apparatus, there is provided a by-pass air-duct in addition to a main air-duct which directly issues a wind against the vehicle being tested while the by-pass air-duct issues an air-conditioned wind to the testing chamber during a test simulating the vehicle velocity being zeroed.

In such conventional type of the wind-velocity controlling apparatus for simulating the vehicle velocity, there is conducted: a control in which a wind velocity simulating a velocity of a traveling vehicle being tested becomes larger as the vehicle velocity increases, that is, a signal of the vehicle velocity is directly proportional to a signal of the wind velocity; or another control in which a signal of the vehicle velocity is inputted to a wind-velocity controlling unit which in turn issues a control signal enabling: both of a main damper installed in the main air-duct and a by-pass damper installed in the by-pass air-duct to control their opening amounts; and an electric motor of a fan installed in the apparatus to be controlled in revolution rate, so that a desired wind-velocity is obtained.

However, in recent years, there has been a strong demand to conduct a test simulating an actual traveling condition of the vehicle in more concrete manner in order to improve the test in accuracy.

However, in the conventional apparatus, it is hard to conduct a test simulating a tail wind or a head wind to which the vehicle is subjected in the actual condition, together with a test adapted to each individual style of the vehicles which differ in CD (drag coefficient) and style from each other. This is a problem inherent in the conventional apparatus.

SUMMARY OF THE INVENTION

It is an object of the present invention to make it possible to conduct a test simulating an actual traveling condition of a self-propelled vehicle, particularly an automobile's under an atmosphere with various temperature/humidity conditions.

More particularly, it is an object of the present invention to make it possible to conduct a test simulating a tail wind and a head wind to which the vehicle being tested is subjected.

It is another object of the present invention to make it possible to conduct a test taking into consideration of the drag coefficient (CD) of the vehicle, particularly the automobile's.

It is further another object of the present invention to make it possible to conduct a test adapted to each individual style of the automobile.

The above objects of the present invention are accomplished by providing the following apparatus:

In a wind-velocity controlling apparatus for simulating a self-propelled vehicle velocity, comprising an environmental testing chamber an interior of which is air-conditioned to be kept in an atmosphere with a predetermined temperature and a predetermined humidity, in which environmental testing chamber is housed said self-propelled vehicle which is an article to be tested and subjected to a wind issued from an air-feed opening of said environmental testing chamber, said wind being controlled in velocity according to a vehicle-velocity signal of said self-propelled vehicle, the improvement which comprises: a vehicle-velocity compensating setting unit for conducting a setting of said apparatus in consideration of a difference in drag coefficient of said self-propelled vehicles from each other while taking into consideration both a tail wind and a head wind, which unit issues an output signal upon said setting of said apparatus; a vehicle-velocity compensating circuit which receives said output signal issued from said vehicle-velocity compensating setting unit to compensate said vehicle-velocity signal, and issues an output signal for controlling a velocity of said wind issued against said self propelled vehicle; and an air-feed height setting unit for setting an issuance level of said wind according to a height of said self-propelled vehicle, which unit issues an output signal for controlling said issuance level of said wind issued from said air-feed opening of said testing chamber.

DESCRIPTION OF THE PREFERRED EMBODIMENT

Hereinbelow, an embodiment of the present invention will be described in detail with reference to the drawings.

Figure 1:
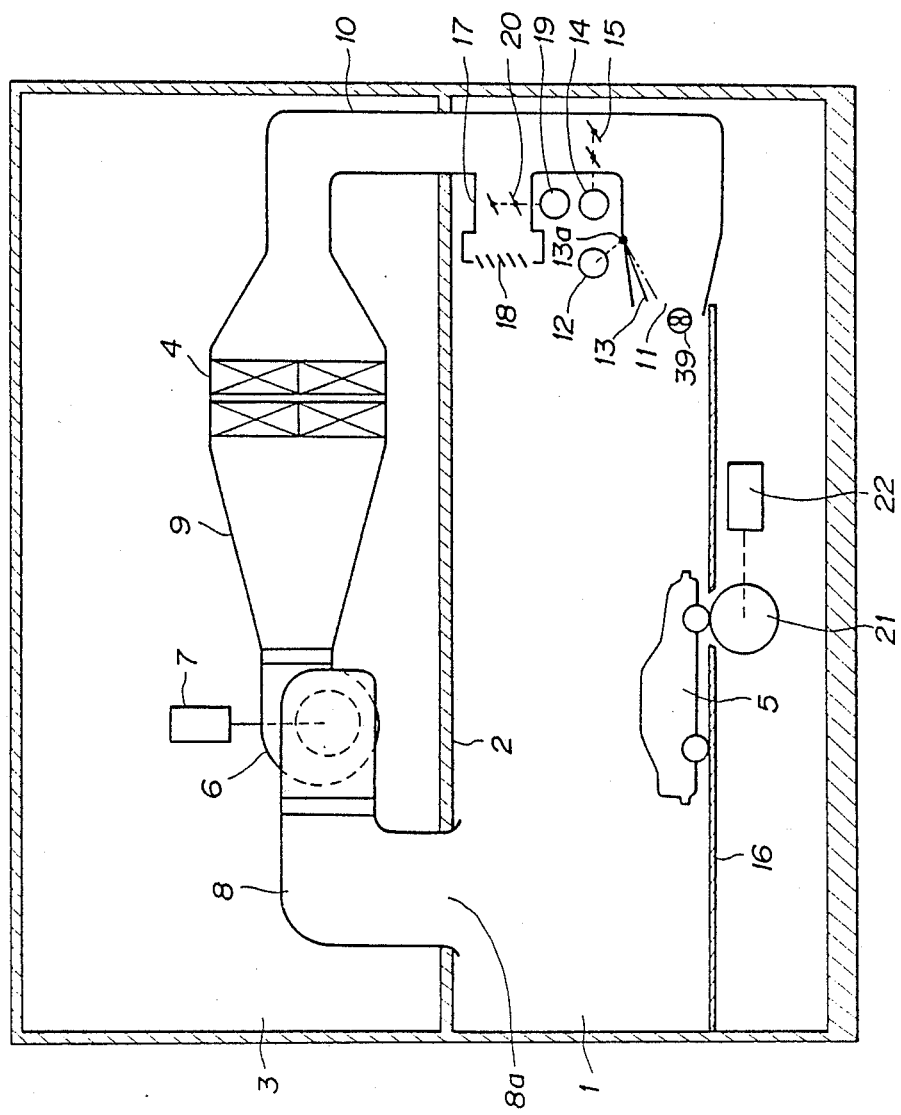
FIG. 1 is a general constructional view of a wind-velocity controlling apparatus of the present invention for simulating a self-propelled vehicle velocity, which apparatus is provided with an environmental testing chamber.

As shown in FIG. 1, a machinery room 3 is partitioned from an environmental testing chamber 1 by means of a ceiling partition 2 and positioned above the testing chamber 1 in a wind-velocity controlling apparatus of the present invention for simulating a self-propelled vehicle velocity. The machinery room 3 is provided with: an air-conditioning unit 4 for air-conditioning an atmosphere of the environmental testing chamber 1 to have the atmosphere keep a desired temperature and a desired humidity; and a fan 6 for issuing a wind against an automobile 5 which is an object to be tested and therefore housed in the testing chamber 1, a velocity of which wind simulates a velocity of the automobile 5 in traveling.

An air-intake opening 8a of an air-intake duct 8 connected with the fan 6 driven by a DC-motor 7 opens into the environmental testing chamber 1 at the ceiling partition 2 thereof. An air-discharging duct 9 of the fan 6 is connected with the air-conditioning unit 4 which is then connected with an air-feed duct 10 at a front end of which is provided an air-feed opening 11 which opens into the testing chamber 1.

To an upper portion of the air-feed duct 11 is fitted through a horizontal axle 13a a vane 13 which is vertically swung around the horizontal axle 13a by means of an electric motor 12, so that an opening amount of the vane 13 is controlled so as to control an issuance level of a wind issued from the air-feed opening 11 to the interior of the testing chamber 1.

Also in the air-feed duct 10, at a position in the vicinity of the air-feed opening 11 thereof is provided a main damper 15 which a drive unit 14 operates to control its opening amount so as to control an air flow issued from the air-feed opening 11 to the testing chamber 1.

A wind thus issued from the air-feed opening 11 is directed to the automobile 5 mounted on a testing stand 16 in the testing chamber 1.

In addition, a by-pass duct 17 is connected with the air-feed duct 10 at a position between the main damper 15 and the air-conditioning unit 4, and opens into the testing chamber 1 at its air-discharging opening 18 which is positioned in the vicinity of the ceiling partition 2 to prevent a wind issued therefrom from being issued against the automobile 5.

In the by-pass duct 17 is provided a by-pass duct 20 which a drive unit 19 operates to control an opening amount thereof so as to control an air flow issued from the air-discharging opening 18 of the by-pass duct 17.

In the testing stand 16 is provided a roller 21 which is brought into a frictional contact with drive wheels of the automobile 5, rotatably driven thereby and connected with a signal generator 22 which issues a vehicle-velocity signal "a" which is directly proportional to the number of revolutions of the drive wheel of the automobile 5 per unit time, that is, a revolution rate of the drive wheel thereof.

Figure 2:
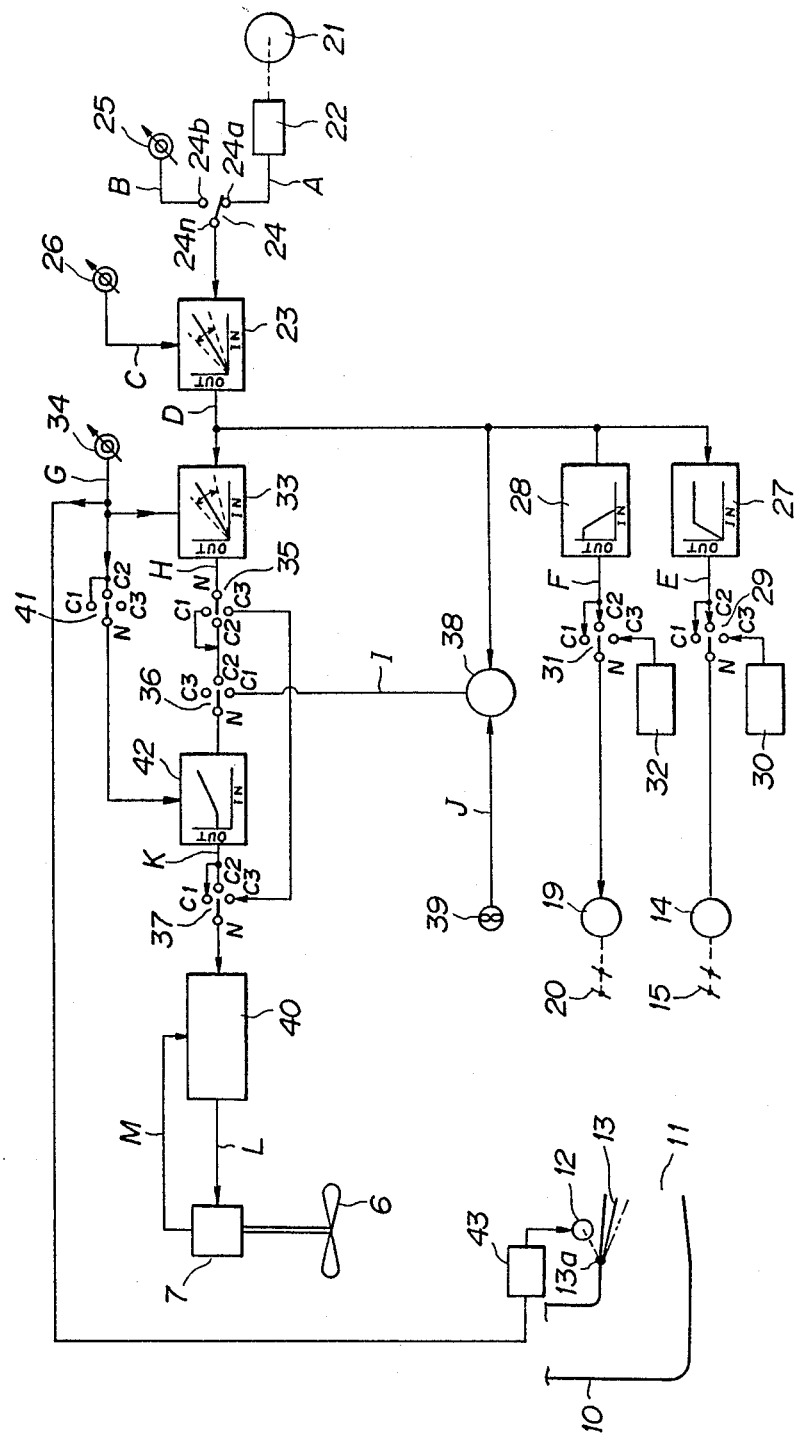
FIG. 2 is a schematic block diagram of the wind-velocity controlling apparatus of the present invention shown in FIG. 1.

Now, a block diagram shown in FIG. 2 will be described. As shown in FIG. 2, a change-over switch 24 is provided with a movable contact 24n and change-over contacts 24a and 24b, and connected with a vehicle-velocity compensating circuit 23 through its movable contact 24n while connected with the signal generator 22 and a manual-setting unit 25 through its change-over contacts 24a and 24b, respectively. Operation of such change-over switch 24 makes it possible to select either the vehicle-velocity signal "A" issued from the signal generator 22 or a manually-set vehicle-velocity signal "B" issued from the manual-setting unit 25.

The vehicle-velocity compensating circuit 23 is connected with a vehicle-velocity compensating setting unit 26 which issues a vehicle-velocity compensating setting signal "C" to the vehicle-velocity compensating circuit 23. By such setting unit 26, the apparatus of the present invention is set in a condition simulating that the automobile which is an object to be tested is subjected to a tail wind or a head wind, and another setting according to a difference of the automobiles in style, that is, according to each individual drag coeffecient (CD) of the automobiles is also applied to the apparatus of the present invention.

In the vehicle-velocity compensating circuit 23, upon receipt of the setting signal "C", the vehicle-velocity signals "A" or "B" is compensated so that the vehicle-velocity compensating circuit 23 issues a compensation-output signal "D".

The compensation-output signal "D" issued from the compensating circuit 23 is inputted to both of a damper opening-amount setting circuit 27 which issues an opening-amount setting signal "E" for the main damper 15 upon receipt of the compensation-output signal "D" and a damper opening-amount setting circuit 28 which issues an opening-amount setting signal "F" for the by-pass damper 20.

In case that the vehicle-velocity signal "A" or "B" is zeroed, it is necessary to fully close the main damper 15, so that the opening-amount setting signal is naturally reduced to zero. However, even in such case, it is necessary to continue the air-conditioning operation of the testing chamber 1, so the opening-amount setting signal "F" makes the by-pass damper 20 be fully opened. On the other hand, the opening-amount setting signal "E" issued from the opening-amount setting circuit 27 increases in proportion to the vehicle velocity of the automobile 5 until the signal "E" reaches a predetermined value corresponding to a predetermined vehicle velocity, and after that the signal "E" makes the main damper 15 be fully opened. On the other hand, the opening-amount setting signal "F" makes the by-pass damper 20 be fully opened until the signal "F" reaches a predetermined value, and after that, the signal "F" is inversely proportional to the vehicle velocity to be reduced to zero.

The damper opening-amount setting circuit 27 is connected with change-over contacts C1, C2 of a change-over switch 29 which is also provided with another change-over contact C3 connected with a fully-opening signal issuance section 30 of the main damper 14. Further provided in such change-over switch 29 is a movable contact "N" connected with the drive unit 14 for operating the main damper 15.

The damper opening-amount setting circuit 28 is connected with change-over contacts C1, C2 of a change-over switch 31 which is also provided with another change-over contact C3 connected with a fully-closing signal issuance section 32 of the by-pass damper 20. Further provided in such change-over switch 31 is a movable contact "N" connected with the drive unit 19 for operating the by-pass damper 20.

On the other hand, the compensation-output signal "D" issued from the vehicle-velocity compensating circuit 23 is also inputted to an air-feed height compensating circuit 33 to which is also inputted is an air-feed height setting signal "G" which is issued from an air-feed height setting unit 34 and permits the air-feed height or air-discharging height of the air-feed opening 11 to be set according to a height of the automobile 5 and also permits the compensation-output signal "D" to be further compensated so that the air-feed height compensating circuit 33 issues a compensation-output signal "H".

In case that the air-feed height of the air-feed opening 11 is changed to a higher one, that is, an opening area of the air-feed opening 11 increases, in order to keep constant a velocity of the wind issued from the air-feed opening 11, it is necessary to increase the air flow issued from the fan 6. Consequently, the compensation-output signal "H" issued from the air-feed height compensating circuit 33 is proportional to the air-feed height setting signal "G", that is, the signal "H" is compensated to become larger as the air-feed height of the air-feed opening 11 is increased.

On the other hand, such air-feed height setting signal "G" is also inputted to an actuating circuit 43 of an electric motor 12 for operating the vane 13 by permitting the actuating circuit 43 to actuate the motor 12, so that an opening amount of the vane 13 is controlled, whereby the air-feed height of the air-feed opening 11 can be changed.

A change-over switch 35 is connected with the air-feed height compensating circuit 33 through its movable contact "N" while connected with a change-over contact C2 of another change-over switch 36 through its change-over contacts C1, C2. Such switch 35 is also provided with another change-over contact C3 connected with a change-over contact C3 of further another change-over switch 37.

The change-over contact C1 of the change-over switch 36 is connected with an output terminal of a wind-velocity-controlling unit 38 which issues a wind-velocity control signal "I" and is connected with: an anemometer 39 which measures a velocity of the wind issued from the air-feed opening 11 to issue an output signal "J" to the wind-velocity controlling unit 38; and the vehicle-velocity compensating circuit 23 which issues the compensation-output signal "D" to the wind-velocity controlling unit 38, so that a feedback control is conducted for accurately obtaining a desired wind velocity. Incidentally, a change-over contact C3 of the change-over switch 36 is dead while the movable contact "N" of such switch 36 is connected with a minimum revolution-rate compensating circuit 42.

An output terminal of the air-feed height setting unit 34 is connected with change-over contacts C1, C2 of a change-over switch 41 which is provided with another change-over contact C3 which is dead. Further provided in such switch 41 is a movable contact "N" connected with the minimum revolution-rate compensating circuit 42.

Even when the vehicle-velocity signal "A" or "B" is zeroed, it is necessary to continue the air-conditioning operation of the testing chamber 1 so as to keep a desired temperature and a desired humidity in the testing chamber 1, so that the fan 6 must be rotatably driven at a low revolution rate. Consequently, a compensation-output signal "K" issued from the minimum revolution-rate compensating circuit 42 is kept at a certain level until an input signal thereof reaches a certain low level, and after that, becomes proportional to such input signal, that is, the signal "K" becomes larger as the input signal inputted to the compensating circuit 42 is increased.

An output terminal of the minimum revolution-rate compensating circuit 42 is connected with the change-over contacts C1, C2 of the change-over switch 37 the movable contact "N" of which is connected with an actuating circuit 40 of the DC-motor 7 which is actuated upon receipt of an actuating signal "L" issued from the actuating circuit 40, so that the fan 6 is rotatably driven by the DC-motor 7 which issues a feedback signal "M" to the actuating circuit 40 thereof for improving the revolution of the DC-motor in accuracy through a feedback control.

In the wind-velocity controlling apparatus of the present invention for simulating the vehicle velocity having the above construction, the vehicle-velocity compensating setting can be conducted in the setting unit 26, while the setting of the height of the air-feed opening 11 can be conducted in the setting unit 34. In addition, the apparatus of the present invention enables the operator to select any one of the following three modes: a first mode prepared by selecting the change-over contact C1 in each of the change-over switches 29, 32, 35, 36, 37 and 41; a second mode prepared by selecting the change-over contact C2 in each of the sames; and a third mode prepared by selecting the change-over contact C3 in each of the sames.

In the first mode, it is possible to conduct a test corresponding to a traveling of the automobile 5 at a constant velocity while both the main 15 and the by-pass 20 dampers are controlled so as to control the atmosphere of the testing chamber 1 in temperature and humidity. In this case, the wind velocity is controlled while measured by the anemometer 39 to effect a feedback control, so that it is possible to issue a wind having an accurately controlled velocity from the air-feed opening 11. In such first mode, the vehicle-velocity compensation and the minimum revolution-rate compensation are conducted.

In the second mode, as is in the first mode, it is possible to conduct a test corresponding to a acceleration/deceleration operation of the automobile 5 while controlling the atmosphere of the testing chamber 1 in temperature and humidity. In this case, since a feedback control of the wind velocity is not conducted, it is possible to realize an immediate correspondence between the vehicle velocity and the velocity of the wind issued from the air-feed opening 11 during the acceleration/deceleration operation of the automobile 5. In this second mode, the compensations of the vehicle velocity, the height of the air-feed opening 11 and the minimum revolution rate are conducted.

In the third mode, the by-pass damper 20 is fully closed, while the main damper 15 is fully opened, so that it is possible to conduct a test corresponding a constant operation of the automobile 5 in addition to a test corresponding to a deceleration/acceleration operation of the same 5 in a condition in which the atmosphere of the testing chamber 1 is not controlled in both temperature and humidity. In this case, also as in the second mode, since the feedback control of the wind velocity is not conducted, it is possible to realize an immediate correspondence between the vehicle velocity and the velocity of the wind issued from the air-feed opening 11 during the acceleration/deceleration operation of the automobile 5.

As described in the above, in the apparatus of the present invention, it is possible to conduct a test simulating the actual traveling condition of the automobile 5 in more concrete manner, since the present invention makes it possible to conduct: a test simulating a condition in which the automobile 5 is subjected to the tail wind and the head wind; and a test simulating a condition in which the automobiles 5 being tested varies in drag coefficient and height, that is, a test adapted to each individual style of the automobile 5 for ensuring the accurate simulation of the actual traveling condition of each individual style of the automobile 5.

What is claimed is:

1. In a wind-velocity controlling apparatus for simulating a self-propelled vehicle velocity, comprising an environmental testing chamber an interior of which is air-conditioned to be kept in an atmosphere with a predetermined temperature and a predetermined humidity, in which environmental testing chamber is housed said self-propelled vehicle which is an article to be tested and subjected to a wind issued from an air-feed opening of said environemental testing chamber, said wind being controlled in velocity according to a vehicle-velocity signal of said self-propelled vehicle, the improvement which comprises: a vehicle-velocity compensating setting unit for conducting a setting of said apparatus in consideration of a difference in drag coefficient of said self-propelled vehicles from each other while taking into consideration both a tail wind and a head wind, which unit issues an output signal upon said setting of said apparatus; a vehicle-velocity compensating circuit which receives said output signal issued from said vehicle-velocity compensating setting unit to compensate said vehicle-velocity signal, and issues an output signal for controlling a velocity of said wind issued against said self-propelled vehicle; and an air-feed height setting unit for setting an issuance level of said wind according to a height of said self-propelled vehicle, which unit issues an output signal for controlling said issuance level of said wind issued from said air-feed opening of said testing chamber.

2. The wind-velocity controlling apparatus for simulating the self-propelled vehicle velocity as set forth in claim 1, wherein: said air-feed opening is fully closed when said vehicle-velocity signal is zeroed, so that a wind is issued from a by-pass duct to said environmental testing chamber to air-condition the same.

3. The wind-velocity controlling apparatus for simulating the self-propelled vehicle velocity as set forth in claim 1, wherein: a main damper provided in a position near said air-feed opening is controlled in its opening amount until said vehicle-velocity signal reaches a predetermined value, and a by-pass damper provided in said by-pass duct is controlled in its opening amount until said vehicle-velocity signal reaches said predetermined value.

4. A wind-velocity controlling apparatus for simulating a self-propelled vehicle velocity, comprising:
(a) a testing chamber (1) provided with therein a testing stand (16) having a driven roller (21) which is brought into a frictional contact with drive wheels of said self-propelled vehicle (5) mounted on said testing stand (16) and rotatably driven by said drive wheels;
(b) an air duct (8, 9, 10) provided with therein a fan (6) and an air-conditioning unit (4), for sucking an air confined in said testing chamber (1) to air-condition said air which is then fed to said testing chamber (1);
(c) a main air-feed opening (11) provided in a position under an air-feed duct (10) of said air duct (8, 9, 10), which air-feed duct opens into said testing chamber (1), said main air-feed opening 11 being laterally directed;
(d) a vane (13) mounted in said air-feed opening (11) through a horizontal axle (13a), vertically swung around said horizontal axle (13a) by means of a drive unit (14) for controlling both of an air-feed height of said main air-feed opening (11) and a discharging amount of the air issued from said main air-feed opening (11);
(e) a by-pass air-discharging opening (18) provided in a position above said main air-feed opening of said air-feed duct (10), said by-pass air-discharging opening (18) being laterally directed;
(f) a main damper (15) and a by-pass damper (20) for opening/closing said air-feed duct (10) and a by-pass duct (17), respectively, said main damper (15) and said by-pass damper (20) being operated by drive units 14 and 19, respectively;
(g) a signal generator (21) for issuing a vehicle-velocity signal which is porportional to revolutions per unit time of said driven roller (21);
(h) a vehicle-velocity compensating circuit (23) which receives a vehicle-velocity signal issued from said signal generator (21), together with a signal (C) issued from a vehicle-velocity compensating setting unit (26), and issues a vehicle-velocity compensation-output signal (D), said signal (C) being dependent on a condition such as a tail wind, a head wind and a drag coefficient varying according to styles of said self-propelled vehicles;
(i) a air-feed height compensating circuit (33) which receives an air-feed height signal "G" issued from an air-feed height setting unit (34) and said compensation-output signal (D) issued from said vehicle-velocity compensating circuit (23) to issue a air-flow compensation-output signal "H" which is proportional to said air-feed height signal "G";
(j) a minimum revolution-rate compensating circuit (42) which receives said signal "G" issued from said air-feed height setting unit 34 and said signal "H" issued from said air-feed height compensating circuit (33) to issue an air-flow compensating revolution-rate control signal "K", provided that a minimum air-flow controlling signal is issued even when said input signals "G", "H" are zeroed;
(k) a fan driving circuit which receives a control signal issued from said minimum revolution-rate compensating circuit (42) to issue a drive signal "L" for controlling a motor (7) of said fan (6) in revolution;
(l) a vane driving circuit (43) which receives said air-feed height signal "H" issued from said air-feed height setting unit (34) to issue a drive signal to a drive unit (12) which vertically swings said vane (13) to make said air-feed opening (11) reach a desired height;
(m) a main-damper opening-amount setting circuit (27) which receives said wind-velocity compensation-output signal "D" issued from said vehicle-velocity compensating circuit (23) to issue a damper opening-amount setting signal "E" to said drive unit (14) of said main-damper, said signal "E" being proportional to said signal "D" until said signal reaches a predetermined small value; and
(n) a by-pass damper opening-amount setting circuit (28) which receives said wind-velocity compensation-output signal issued from said vehicle-velocity compensating circuit (23), and issues a closing signal "F" to a drive unit 19 of said by-pass damper (20), said signal "F" being proportional to said wind-velocity compensation-output signal "D".

5. A wind-velocity controlling apparatus for simulating a self-propelled vehicle velocity, comprising:
(a) a testing chamber (1) provided with therein a testing stand (16) having a driven roller (21) which is brought into a frictional contact with drive wheels of said self-propelled vehicle (5) mounted on said testing stand (16) and rotatably driven by said drive wheels;

(b) an air duct (8, 9, 10) provided with therein a fan (6) and an air-conditioning unit (4), for sucking an air confined in said testing chamber (1) to air-condition said air which is then fed to said testing chamber (1);

(c) a main air-feed opening (11) provided in a position under an air-feed duct (10) of said air duct (8, 9, 10), which air-feed duct opens into said testing chamber (1), said main air-feed opening 11 being laterally directed;

(d) a vane (13) mounted in said air-feed opening (11) through a horizontal axle (13a), vertically swung around said horizontal axle (13a) by means of a drive unit (14) for controlling both of an air-feed height of said main air-feed opening (11) and a discharging amount of the air issued from said main air-feed opening (11);

(e) a by-pass air-discharging opening (18) provided in a position above said main air-feed opening of said air-feed duct (10), said by-pass air-discharging opening (18) being laterally directed;

(f) a main damper (15) and a by-pass damper (20) for opening/closing said air-feed duct (10) and a by-pass duct (17), respectively, said main damper (15) and said by-pass damper (20) being operated by drive units 14 and 19, respectively;

(g) a signal generator (21) for issuing a vehicle-velocity signal which is porportional to revolutions per unit time of said driven roller (21);

(h) a vehicle-velocity compensating circuit (23) which receives a vehicle-velocity signal issued from said signal generator (21), together with a signal (C) issued from a vehicle-velocity compensating setting unit (26), and issues a vehicle-velocity compensation-output output signal (D), said signal (C) being dependent on a condition such as a tail wind, a head wind and a drag coefficient varying according to styles of said self-propelled vehicles;

(i) a air-feed height compensating circuit (33) which receives an air-feed height signal "G" issued from an air-feed height setting unit (34) and said compensation-output signal (D) issued from said vehicle-velocity compensating circuit (23) to issue a air-flow compensation-output signal "H" which is proportional to said air-feed height signal "G";

(j) a minimum revolution-rate compensating circuit (42) which receives signal "G" issued from said air-feed height setting unit 34 and said signal "H" issued from said air-feed height compensating circuit (33) to issue an air-flow compensating revolution-rate control signal "K", provided that a minimum air-flow controlling signal is issued even when said input signals "G", "H" are zeroed;

(k) a fan driving circuit which receives a control signal issued from said minimum revolution-rate compensating circuit (42) to issue a drive signal "L" for controlling a motor (7) of said fan (6) in revolution;

(1) a vane driving circuit (43) which receives said vane height signal "H" issued from said air-feed height setting unit (34) to issue a drive signal to a drive unit (12) which vertically swings said vane (13) to make said air-feed opening (11) reach a desired height;

(m) a main-damper opening-amount setting circuit (27) which receives said wind-velocity compensation-output signal "D" issued from said vehicle-velocity compensating circuit (23) to issue a damper opening-amount setting signal "E" to said drive unit (14) of said main damper, said signal "E" being proportional to said signal "D" until said signal reaches a predetermined small value; and (n) a by-pass damper opening-amount setting circuit (28) which receives said wind-velocity compensation-output signal issued from said vehicle-velocity compensating circuit (23), and issues a closing signal "F" to a drive unit 19 of said by-pass damper (20), said signal "F" being proportional to said wind-velocity compensation-output signal "D";

(o) a construction in which: between said air-feed height compensating circuit (33) and said minimum revolution-rate compensating circuit (42) is disposed are a first change-over switch (35) provided with contacts C1, C2 and C3 adapted to select three kinds of modes and a second change-over switch (36) provided contacts C1, C2 and C3 adapted to select said modes, so that a second mode contact of said second change-over switch (36) is connected with an output terminal of a wind-velocity controlling unit (38) which issues a wind-velocity control signal (I) which is a function of a difference between a wind-velocity signal (J) issued from an anemometer (39) for detecting a wind velocity at a position in said air-feed opening (11) and said wind-velocity compensation-output signal (D) issued from said vehicle-velocity compensating circuit (23); between said minimum revolution-rate compensating circuit (42) and a fan driving circuit (40) is provided a third change-over switch (37) provided with contacts C1, C2 and C3 adapted to select said three modes, so that that a second mode contact of said third change-over switch (37) is connected with a second mode contact of said first change-over switch (35) through a by-pass line; between said main damper opening-amount setting circuit (27) and said drive unit (14) of said main damper (15) is disposed a change-over switch (29) for changing over said main damper (15), said change-over switch (29) being provided with change-over contacts C1, C2 and C3 adapted to select said three kinds of modes, so that said third mode contact of said change-over switch (29) is connected with a fully-opening signal issuance section of said main damper (15); and between said by-pass damper opening-amount setting circuit (28) and said drive unit (19) for operating said by-pass damper (20) is disposed a change-over switch (31) for changing over said by-pass damper (20), said change-over switch (31) being provided with change-over contacts C1, C2 and C3 adapted to select said three kinds of modes, so that said third mode contact of said change-over switch (31) is connected with a fully-closing signal issuance section of said by-pass damper (20).

* * * * *